United States Patent
Corodimas et al.

(10) Patent No.: US 12,217,286 B2
(45) Date of Patent: Feb. 4, 2025

(54) SYSTEMS AND INTERFACES FOR MANAGING CONTENT

(71) Applicant: Tenovos Corporation, New York, NY (US)

(72) Inventors: Matthew Corodimas, Fullerton, CA (US); Neil Grant, New Port Richey, FL (US)

(73) Assignee: Tenovos Corporation, New York, NY (US)

( * ) Notice: Subject to any disclaimer, the term of this patent is extended or adjusted under 35 U.S.C. 154(b) by 0 days.

(21) Appl. No.: 16/554,389

(22) Filed: Aug. 28, 2019

(65) Prior Publication Data

US 2020/0074510 A1     Mar. 5, 2020

Related U.S. Application Data

(60) Provisional application No. 62/723,740, filed on Aug. 28, 2018.

(51) Int. Cl.
*G06Q 30/0241*     (2023.01)
*G06F 3/0482*     (2013.01)
*G06F 8/34*     (2018.01)

(52) U.S. Cl.
CPC ....... *G06Q 30/0276* (2013.01); *G06F 3/0482* (2013.01); *G06F 8/34* (2013.01); *G06Q 30/0277* (2013.01)

(58) Field of Classification Search
CPC .............. G06Q 30/02; G06Q 30/0276; G06Q 30/0277; G06F 3/0482; G06F 8/34
See application file for complete search history.

(56) References Cited

U.S. PATENT DOCUMENTS

2008/0082381 A1*   4/2008   Muller ............... G06Q 30/0282
                                                         705/344
2011/0208579 A1*   8/2011   Krishnamoorthy ..........
                                            G06Q 30/0257
                                                          705/14.55

(Continued)

OTHER PUBLICATIONS

Kavasidis et al. "An innovative web-based collaborative platform for video annotation." Multimedia Tools and Applications, 70 (2014): 413-432 (Year: 2014).*

(Continued)

*Primary Examiner* — Resha Desai
*Assistant Examiner* — Patrick Kim
(74) *Attorney, Agent, or Firm* — Wolf, Greenfield & Sacks, P.C.

(57) ABSTRACT

In some aspects, the described systems and methods provide for managing content. The method comprises receiving respective representations of a plurality of content elements, at least one of the plurality of content element having metadata information, displaying a representation of the content element in a user interface to a first user, sending the representation of the content element from the first user to a second user, indicating an edit request from the second user to the first user within the user interface, opening content element editing software via a link; performing at least one edit operation within an interface of the content element editing software on the content element based on the edit request; sending a representation of the edited content element from the first user to the second user; and approving the edited content element.

15 Claims, 5 Drawing Sheets

(56) References Cited

U.S. PATENT DOCUMENTS

| | | | | |
|---|---|---|---|---|
| 2014/0282076 A1* | 9/2014 | Fischer | ............... | G06Q 10/101 |
| | | | | 715/751 |
| 2015/0248484 A1* | 9/2015 | Yu | ...................... | G06F 16/9535 |
| | | | | 707/711 |
| 2016/0294762 A1* | 10/2016 | Miller | ................. | H04L 65/4084 |
| 2018/0189255 A1* | 7/2018 | Kofman | ............... | G06F 3/0482 |
| 2018/0191805 A1* | 7/2018 | Hurwitz | ................. | H04L 67/06 |

OTHER PUBLICATIONS

International Search Report and Written Opinion mailed Nov. 18, 2019 in connection with International Application No. PCT/US2019/048620.

International Preliminary Report on Patentability mailed Mar. 11, 2021 in connection with International Application No. PCT/US2019/048620.

Extended European Search Report dated Apr. 8, 2022, in connection with European Application No. PCT/US2019/048620.

Supplementary European Search Report dated Apr. 26, 2022, in connection with European Application No. PCT/US2019/048620.

* cited by examiner

SYSTEMS AND INTERFACES FOR MANAGING CONTENT

RELATED APPLICATIONS

This Application is a Non-Provisional of Provisional (35 U.S.C. 119(e)) of U.S. Provisional Patent Application Ser. No. 62/723,740, filed Aug. 28, 2018, entitled "SYSTEMS AND INTERFACES FOR MANAGING CONTENT," the disclosure of which is incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Systems exist that are used to manage the creation of content, such as documents, video, and web-enabled content. In particular, there are many different applications that are used to create and manage content in various forms and types, with some being specially designed to manage and distribute particular types of content. Also, such content is produced and stored in various systems, such as document management systems that allow files to be stored in a shared repository accessible by multiple users rather than solely in a user's local file system.

SUMMARY

As discussed, there are many software systems that are used to manage the creation of content. The inventors have appreciated that existing software tools used to create and manage such content are not sufficient in that there are separate applications that are required to search, navigate, edit, store, distribute, monitor performance, and perform workflow coordination of such content. Such content may be, for example, certain media types (e.g., images, video files, etc.) that are used in creatives for advertising. This causes users that create and review such content to perform multiple user interface actions that are inefficient, such as retrieving creatives, editing and sharing them with other users.

What is needed are systems and associated interfaces that permit users to more efficiently manage the overall life cycle of a creative. To this end, a computer-based interface is provided that allows the user to review creatives and work with them in a creative-centric view within a user's workspace. The computer-based interface permits user access to the creatives, and integrates applications that are used to create them within the user's desktop environment. Such linking and integration through a creative-centric view reduces the number of interfaces and user actions that a user needs to perform the disparate tasks that need to be performed over the creative's lifecycle.

In some embodiments, a desktop application is provided that allows a user that authors such creatives to manage their creatives within a single desktop view. In particular, a desktop "pallet" application provides tools that allow such creative users to be able to interact with enterprise solutions and applications without the need to open web browsers and other applications, or to log into them separately. In some embodiments, a desktop pallet application provides aggregation and synchronization of, and interaction with content, workflows, tasks, communications, processes and plugins from enterprise systems that a creative user needs to use with their clients in a single desktop pallet which is accessible from the desktop of a computer user.

In some embodiments, the described systems and methods provide for authoring creatives in a content and creative-centric user interface. In the application, a first user receives a plurality of content elements, at least one of which has metadata information. The first user sends the at least one content element to a second user via the user interface. The second user makes an edit request to the first user via the user interface. The first user opens content element editing software within the user interface via a plugin. The first user edits the at least one content element in the content element editing software based on the edit request. The first user resends the at least one content element to the second user via the user interface. The second user then approves the content element.

In some embodiments, the user interface can be used to create content as well. The content element editing software is opened by a first user within the user interface by a plugin. The user then creates the plurality of content elements in the content element editing software.

In some embodiments, the status of the at least one content element can be tracked in a workflow manager using its associated metadata information.

In some embodiments, the user can combine content elements into an advertisement and publishing the advertisement within the user interface.

In some embodiments, the at least one content element comprises a file type, the file type comprising at least one of a video file, an image file, and a document. In some embodiments, the content editing software can edit the file type of the at least one content element.

According to one aspect, a computer-implemented method for creating an advertising creative is provided. The method comprises acts of receiving, from a distributed computer system, respective representations of a plurality of content elements, at least one of the plurality of content element having metadata information, displaying a representation of the at least one content elements in a user interface to a first user, sending, responsive to a control input within the user interface, the representation of the at least one content element from the first user to a second user, indicating an edit request from the second user to the first user within the user interface, opening, via a link, content element editing software, performing at least one edit operation, responsive to an editing control operated by the first user within an interface of the content element editing software, on the at least one content element based on the edit request, sending, responsive to a control input within the user interface, a representation of the edited at least one content element from the first user to the second user, and approving, by the second user, the edited at least one content element.

According to one embodiment, the link comprises a link to a plugin for the content element editing software. According to one embodiment, the method further comprises the act of tracking, by a workflow manager, a status of the at least one content element using the metadata information. According to one embodiment, the method further comprises the acts of performing at least one combining operation, responsive to a control input within the user interface, combining the at least one content element with the plurality of content elements into an advertisement, and publishing, responsive to a control input within the user interface, the advertisement. According to one embodiment, at least one content element comprises a file type, the file type comprising at least one of a video file, an image file, and a document. According to one embodiment, the content element editing software can edit the file type of the at least one content element. According to one embodiment, the act of sending a representation of the edited at least one content element from the first user to a second user comprises updating, responsive to a control input within the user interface, the at least one content element on the distributed computer system with the edited at least one content element, and receiving, from the distributed computer system, a representation of the edited at least one content element.

According to one aspect, a computer-implemented system for creating an advertising creative is provided. The system comprises a communication interface configured to receive, from a distributed computer system, respective representations of a plurality of content elements, at least one of the plurality of content element having metadata information, a user interface configured to display a representation of the at least one content elements to a first user, at least one computer processor programmed to send, responsive to a control input within the user interface, the representation of the at least one content element from the first user to a second user, indicate an edit request from the second user to the first user within the user interface, open, via a link, content element editing software, perform at least one edit operation, responsive to an editing control operated by the first user within an interface of the content element editing software, on the at least one content element based on the edit request, send, responsive to a control input within the user interface, a representation of the edited at least one content element from the first user to the second user, and approve, by the second user, the edited at least one content element.

According to one embodiment, the link comprises a link to a plugin for the content element editing software. According to one embodiment, the system further comprises a workflow manager configured to track a status of the at least one content element using the metadata information. According to one embodiment, at least one computer processor is further programmed to perform at least one combining operation, responsive to a control input within the user interface, to combine the at least one content element with the plurality of content elements into an advertisement, and publish, responsive to a control input within the user interface, the advertisement. According to one embodiment, at least one content element comprises a file type, the file type comprising at least one of a video file, an image file, and a document. According to one embodiment, the content element editing software can edit the file type of the at least one content element. According to one embodiment, at least one computer processor is further programmed to update, responsive to a control input within the user interface, the at least one content element on the distributed computer system with the edited at least one content element, and receive, from the distributed computer system, a representation of the edited at least one content element.

According to one aspect, a computer-implemented system for managing an advertising creative is provided. The system comprises a user interface configured to display to a user respective representations of a plurality of content elements relating to the advertising creative, and configured to permit the user to manage the plurality of content elements, the user interface comprising at least one interface component configured to display a grouping of one or more content elements of the plurality of content elements to which the user is assigned, at least one interface component that permits the user to perform one or more operations regarding one or more content elements of the plurality of content elements to which the user is assigned, the one or more operations including at least one of a group comprising viewing an production status of the one or more content elements, editing the one or more content elements through a linked microservice, and communicate to another user, a required action by the another user in relation to the one or more content elements.

According to one embodiment, the system further comprises a database for storing the one or more content elements and metadata information. According to one embodiment, the metadata information includes at least one of a group of information comprising workflow information identifying a workflow status of the one or more content elements, and worklist information identifying one or more content elements being acted on by the user. According to one embodiment, at least one interface component configured to display to a user respective representations of a plurality of content elements relating to the advertising creative further comprises an interface component configured to display, for each of a respective representation of the plurality of content elements displayed in the user interface, an indicator that identifies a workflow status of the respective content element.

According to one aspect, a distributed system is provided. The system comprises a client-based user interface comprising a plurality of content elements associated with a particular user, at least one of the plurality of content elements having metadata information, a task manager adapted to assign metadata to the at least one content element, the metadata including task information associated with development of the at least one content element, a storage manager adapted to store the at least one content element and metadata, indicating, to a management system, progress of the development of the at least one content element.

According to one embodiment, system further comprises a plug-in manager adapted to display, to the user in the client-based interface, one or more plugins associated with the at least one content element. According to one embodiment, at least one content element is used in online advertising including an advertisement, and wherein the distributed system further comprises a component that is adapted to store and analyze metrics relating to consumption of the advertisement. According to one embodiment, the system further comprises a workflow manager that coordinates development of the at least one content element. According to one embodiment, at least one content element is used in online advertising including an advertisement, and wherein the distributed system further comprises tools used to publish the advertisement. According to one embodiment, at least one content element comprises at least one of a video element, an image element and a document. According to one embodiment, the client-based user interface permits single-client access to the at least one content element.

According to one embodiment, storage, task management, and security functions are abstracted from the client-based user interface.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed above with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

As discussed above, existing software tools used to create and manage content are not sufficient in that there are separate applications that are required to search, navigate, edit, store, and perform workflow coordination of such content. This causes users that create and review such content to perform multiple user interface actions that are inefficient, such as retrieving creatives, editing and sharing them with other users. The inventors have recognized systems and associated interfaces that permit users to more efficiently manage the overall life cycle of a creative are needed.

In particular, the described systems and methods provide for, among other things, a desktop pallet application which provides tools that allow users that author creatives to be able to interact with enterprise solutions and applications without the need to open web browsers and other applications outside of the desktop pallet application, or to log into them separately. In some embodiments, a desktop pallet application provides aggregation and synchronization of, and interaction with content, workflows, tasks, communications, processes and plugins from enterprise systems that a creative user needs to use with their clients in a single desktop pallet which is accessible from the desktop of a computer user.

The described systems and methods improve computerized content and creative management by enabling interactions with content, workflows, tasks, communications, processes and plugins to be accomplished within a single desktop pallet application. This increases the efficiency of computerized content and creative management systems by reducing inefficient user interface interactions and providing better integration with enterprise solutions and applications.

The described systems and methods provide a particular solution to the problem of providing an efficient, scalable enterprise content management system. The described systems and methods provide a particular way for managing content and creatives by, among other things, receive, send, request edits of, edit, resend, and approve content elements within a content management system.

The described systems and methods may be used for several different purposes including, but not limited to, creating, editing, storing, annotating, marking up, and approving content or creatives. The user may combine content into creatives, which may be used to distribute and publish advertising campaigns.

Figure 1:
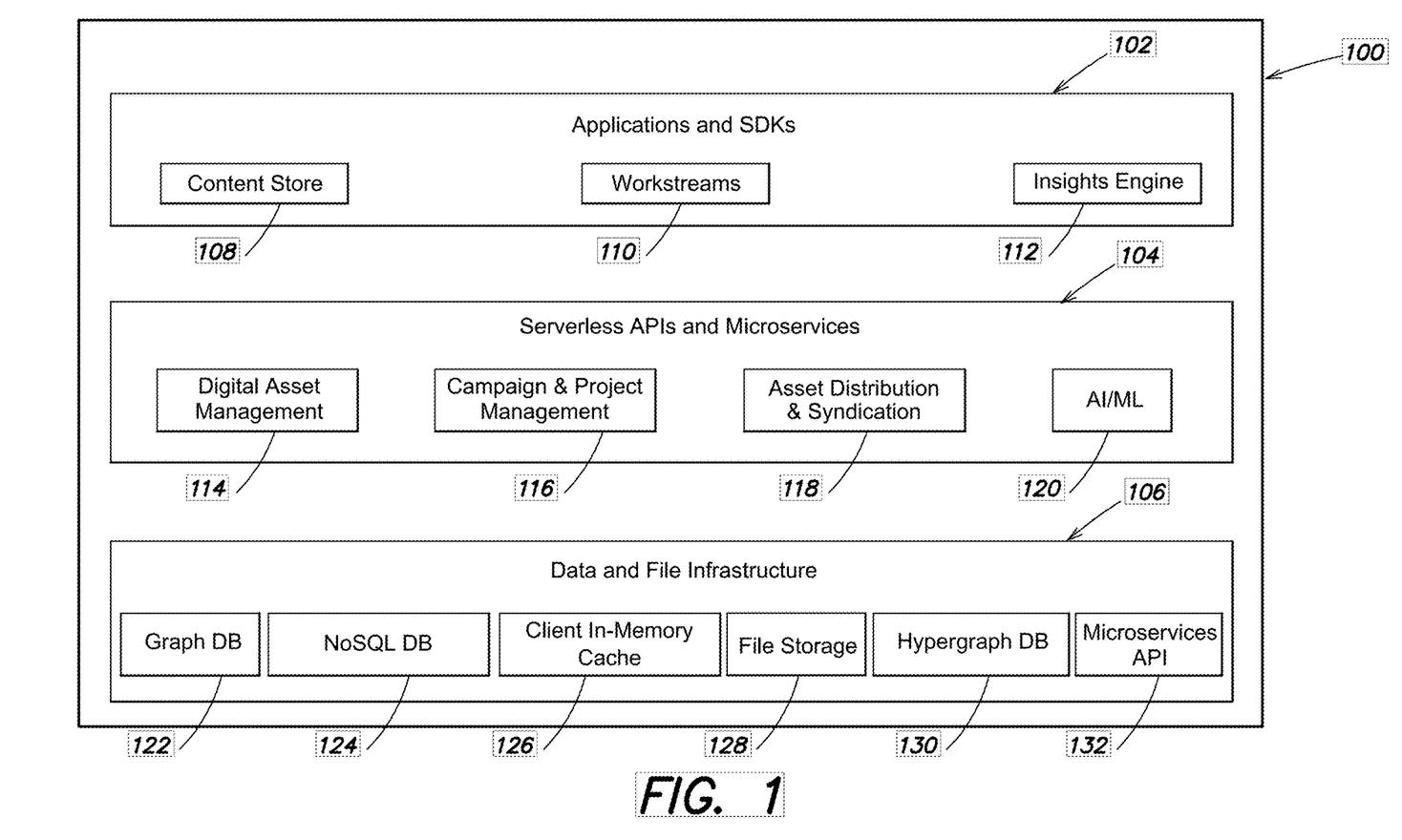
FIG. 1 is a block diagram of a platform in accordance with some embodiments of the technology described herein.

FIG. 1 shows a block diagram of a platform 100 in accordance with some embodiments of the technology described herein. The platform 100 may be comprised of applications and software development kits (SDKs) 102, serverless application program interfaces (APIs) and microservices 104, and a data and file infrastructure 106.

Applications and SDKs 102 may include a content store 108, workstreams 110, and insights engine 112.

In some embodiments, a content store 108 is provided that tracks a content asset throughout its lifecycle. For instance, an example lifecycle involves ideation, collaboration, sharing, generation, and creation, returning to ideation. In such a lifecycle, the platform 100 manages the asset as it travels throughout its existence and interfaces with various systems. For example, in some embodiments, the platform 100 controls digital files, permissions, and storage all in one place (e.g., the platform 100). In additional embodiments, either alone or in combination with other embodiments, the platform 100 permits users to ingest, store, search, browse, organize, share, review and download digital assets, written documents, among other features.

In some embodiments, the platform 100 may be programmed to manage a content asset in a workstream 110 construct. For example, in one implementation, a cloud-based workstream 110 may be provided for asset planning, production, review, approval, distribution, publishing and storage of digital content elements. Such workstreams 110 may connect teams and asset handling applications for end-to-end lifecycle management of selected content elements.

Some embodiments relate to an insights engine 112 capable of providing trends, forecasts and predictions for digital asset managers. Because, according to some embodiments, the assets are tracked throughout their lifecycle by the platform 100, characteristics relating to digital assets may be forecasted and predicted. In some embodiments, the system creates analytical models to measure creative operations, enterprise asset management, distribution and syndication. For example, the platform 100 may use AI/ML to monitor performance factors such as speed to success, quality of success, and creation efficiency. Where factors are not meeting modelled behavior, the platform's 100 insights engine 112 makes recommendations based on historical trending information for other similarly created content which has previously met the criteria. The desired behavior of content sent into distribution channels may also be modeled.

Some implementations provide a capability of running A/B tests on models and incorporating external data sets while analyzing results. Further, in some embodiments, the system is capable of connecting to a Data Management Platform to send a feed of personalized asset tags for distributed and syndicated assets.

In some embodiments, the insights engine 112 can provide trends, forecasts, and predictions for any areas where the platform can capture trending information or apply anonymized trending information to understand patterns of usage.

Serverless APIs and microservices 104 may include digital asset management (DAM) 114, campaign and project management 116, asset distribution and syndication 118, and AI/ML 120. DAM 114 may be used around content including the ability to secure, find, update and delete content. Campaign and project management 116 allows tasks to be created, assigned, have their statistics updated, and deleted. Asset distribution and syndication 118 allows content to be delivered and consumed in various manners as described below.

In some embodiments, the platform 100 uses microservices to carry out necessary functions. When a micro service is called, a new instance of the microservice is automatically invoked to carry out the function. When the microservice is complete the created instance is destroyed. This allows the platform 100 to operate at true webscale from a function perspective. This approach also allows the platform 100 to be serverless and cloud agnostic. The lack of a physical or virtual server reduces costs and eliminates the need for resources to be allocated to running an operating system of some kind.

In some embodiments, the platform leverages modern embeds best-of-breed solutions to deliver a refined enterprise content management and digital asset platform. The platform may include an enterprise software as a service platform with available multi-tenant and dedicated stacks. The platform may utilize a truly cloud-native, web-scale enterprise architecture built on open standards, which increases speed and agility. In some embodiments, the platform may be fully modular, managing all content, media, workstreams, and analytics.

In some implementations, the platform 100 applies AI/ML 120 to deliver on the creation and distribution of marketing assets for strategic and competitive advantages by driving out costs, reducing redundancy, and enabling automation. Benefits of using these AI/ML 120 technologies in the advertising space include up to a 30% increase in rich, relevant content delivered on target, gains in brand affinity and consumer engagement, top line growth and increased revenues, and rising stakeholder engagement across investors, communities and employees. In some embodiments, the platform 100 utilizes AI services, ML, deep learning, and neural network technologies. In some embodiments, these technologies may be implemented in an open-source framework such as Tensorflow. These technologies may also be implemented in a proprietary framework to further extend functionality.

In some embodiments, these AI/ML 120 technologies may be used for content management and editing. For example, the platform 100 may use image recognition, pattern recognition, and video analysis to automatically tag content. The platform 100 may use these technologies for speech to text, text translations into multiple languages, and optical character recognition. In some embodiments, the platform 100 may automatically apply metadata based on historical information it understands.

In some embodiments, these AI/ML 120 technologies may be used for user recommendations. For example, the platform 100 may use AI/ML 120 to decide when and how to present notifications to the users of exceptions, tasks, trending search terms, and relevant content. The platform 100 may use these technologies to improve search recommendations based off natural language processing, improving search personalization based on the frequency of searching. In some embodiments, the platform 100 may use these technologies to identify best practices and make recommendations to apply these to other areas.

In some embodiments, these AI/ML 120 technologies may be used to improve and automate certain aspects of workflows. For example, the platform 100 may use AI/ML 120 to monitor workflow behaviors such as efficiency, load balancing, and work forecasting, taking corrective actions or escalating as necessary when any of these behaviors is trending in a problematic direction.

The data and file infrastructure 106 may include a content graph database 122, NoSQL database 124 to improve record recovery performance, client in-memory cache 126, both cloud and on-premise file storage 128, a hypergraph database 130, and a serverless microservices API 132.

In some embodiments, both a content graph database 122 and a hypergraph database 130 are used to enable webscale data services. Data is represented as nodes which are tied together through relationships. Each Node represents an entity which can be made up of multiple data fields. The use of a graph database 122 helps reduce duplication of data, which in itself reduces the size required for the database. A hypergraph database 130 is used to allow a further reduction in the number of relationships required to relate the nodes. This is achieved through being able to add conditions to the relationships, which also reduces duplication. Using graph database 122 and hypergraph database 130 together have fewer limitations and reduce issues with data and its relevant connections at webscale.

In some embodiments, tools may be provide that associate tasks with creative elements, and such tasks may be assigned to particular users to allow them to manage the creation, editing and review of such elements. A distributed management system may be provided that tracks tasks assigned to particular users and manages workflows for assigning, producing, and reviewing the creative elements associated with such tasks. In some embodiments, coordination of tasks may be provided for an enterprise, where various roles may interact on content elements. In some implementations, information may be organized into campaigns which includes a data structure that describes the campaign, metadata relating to the campaign, and any content associated with that campaign.

In some other embodiments, a platform is provided that allows for a more efficient way of creating and managing creatives, highlighting the creative itself, rather than the applications used to achieve it. To this end, a platform that tracks creatives and their authors, tasks that are used to assign and manage creatives, and connectivity tools integrated with common storage, communication, and authoring applications is provided to allow for creative-based workflows and communication. In some implementations, a platform such as the Tenovos Global Marketing Supply Chain™ (GMSC) is provided that enables word-class brands to more easily adapt to the ever-changing needs of customers through data-driven insights. In some embodiments, such a platform empowers marketers and enterprises to create memorable customer experiences that drive a company's bottom line by rapidly reconfiguring and deploying marketing assets across all channels at the global, regional, and local levels.

In some embodiments, a platform is provided that increases the efficiency of creating marketing content (e.g., by providing more effective tools and tools that reduce the overhead for creating and sharing content). For instance, marketing content velocity increases content "on-target" by 30% while reducing overall spend and delivering brand-consistency on a global basis. Increased efficiency and productivity drives out costs, reduces redundancy, and enables automation (e.g., by applying artificial intelligence ("AI") or machine learning ("ML") to the creation and distribution of marketing assets in some embodiments). Improved traceability provided by some implementations of a platform allows for the monitoring of digital asset lifecycles end-to-end, tracking marketing assets through revision, approvals, and deployment for sets of users throughout an enterprise.

In some embodiments, the platform may be built on an integrated set of tools and methods that transparently apply standards, metadata and processes throughout the digital asset lifecycle. In some embodiments, the platform interoperates with leading software and microservices, allowing users to easily onboard acquisitions, partners and assets. Users at all levels may benefit from accurate and timely data and reduction of wasted effort that has become widespread in traditional operations.

In some embodiments, the platform interoperates seamlessly with applications, software, services and legacy systems across the enterprise. SDK technology enables a seamless user experience by ensuring content is clearly defined and consistent in packaging and integrity when transmitted between systems. For those requirements not met by SDKs, the platform may implement REST APIs for other integration needs. The use of SDKs and APIs allow integration with hundreds of popular marketing technology applications. Further, according to some embodiments, data may be integrated within an interface using plug-ins with simple, point-and-click setup within the interface. In some implementations, the platform may support transmitting/receiving secure and scalable custom notifications to/from external sources such as Salesforce, SAP, Microsoft, Adobe, Oracle, Slack, Workfront, Dropbox, Google Docs, Box, Salsify, and mParticle.

Further, the platform may automate metadata management and security via interoperation with PM, PIM, MAM, MDM, MRM, DAM, ERP and CMS systems. Also, the platform may be capable of adding plugins for a wide variety of creative software (e.g., application software) to perform day-to-day asset management tasks and ease adoption challenges.

Figure 2:
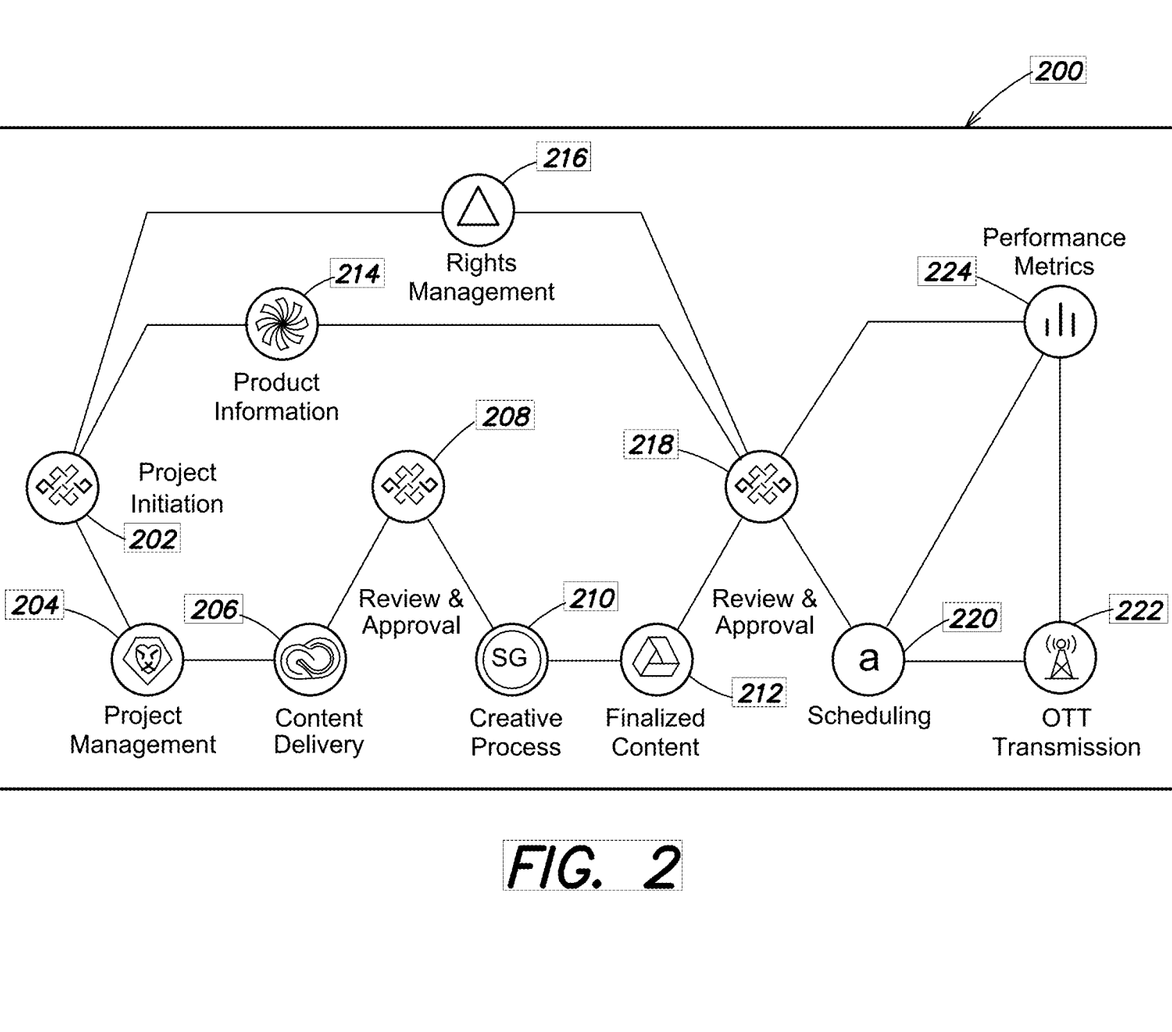
FIG. 2 is a block diagram of a process for managing an advertising project in accordance with some embodiments of the technology described herein.

FIG. 2 is a block diagram of a process 200 for managing an advertising project in accordance with some embodiments of the technology described herein. In some embodiments, the process 200 creates, edits, approves, distributes, and monitors advertising creatives. In particular, at block 202, the process 200 begins as the project is initiated. During project initiation, requirements for the advertising project may be gathered. From here, three sets of tasks occur concurrently: content management, product information, and rights management.

At block 204, content management begins with project management. Project management may involve identification of existing content assets to use in the project, identifying teams to work on the project, and setting deliverable milestones. Content assets may be stored in a user's desktop, remote storage, other enterprise applications, or a content store. Each of these storage locations may be accessed, navigated, and searched through the desktop pallet application. At block 206, identified content assets are delivered through the desktop pallet application to be reviewed and approved at block 208. At block 210, approved content assets are combined into creatives within the desktop pallet application. In some embodiments, the creatives are created using the process described below. At block 212, content in the creative is finalized and submitted for review and approval within the desktop pallet application at block 218.

At block 214, product information is gathered for use in the project concurrently with content management and product information gathering. Product information may include product features, product uses, testimonials, sales targets, and target demographics. This information may be used to assist in identifying content assets, target markets, and advertisement scheduling. The information is submitted for review and approval within the desktop pallet application at block 218.

At block 216, a rights management process occurs in parallel with content management and product information gathering. In some embodiments, this process ensures that rights have been secured for all content assets used within the project. For example, there may be updated rights terms where a specific change is required to the produced content rights terms outside of the standard rights contract with the organization. In such a case the rights management process may capture acceptance of rights through an electronic signature. Rights management information is submitted for review and approval within the desktop pallet application at block 218.

At block 218, the submitted content, product information, and rights management information are merged, reviewed, and approved. The resulting approved creative is then ready for distribution. At block 220, the advertisements using the approved creative may be scheduled for publication. Based on the type of creative, the creative may be scheduled for publication on Internet websites, online video, streaming video, television, billboards, print media, and other media. In some embodiments, this scheduling may occur directly from the desktop pallet application platform. At block 222, distribution for publication may include over-the-top media transmissions. In some embodiments, this transmission may occur directly from the desktop pallet application platform.

In some embodiments, performance metrics may be collected and tracked at block 224. Metrics may be collected from the creative approved at block 218, the creative scheduling at block 220, and any over-the-top media transmissions at block 222. Metrics that may be collected include customer information, content asset information, creative information, publication schedule, transmission schedule, media type, views, click-through, and return on investment (ROI). These metrics may be viewed and tracked in the desktop pallet application, a dashboard interface, or enterprise software. These metrics may also be used by an insights engine 112 as data for forecasting and predicting trends as previously described. These metrics may also be used by AI or ML as previously described.

Managing Workstreams

Figure 3:
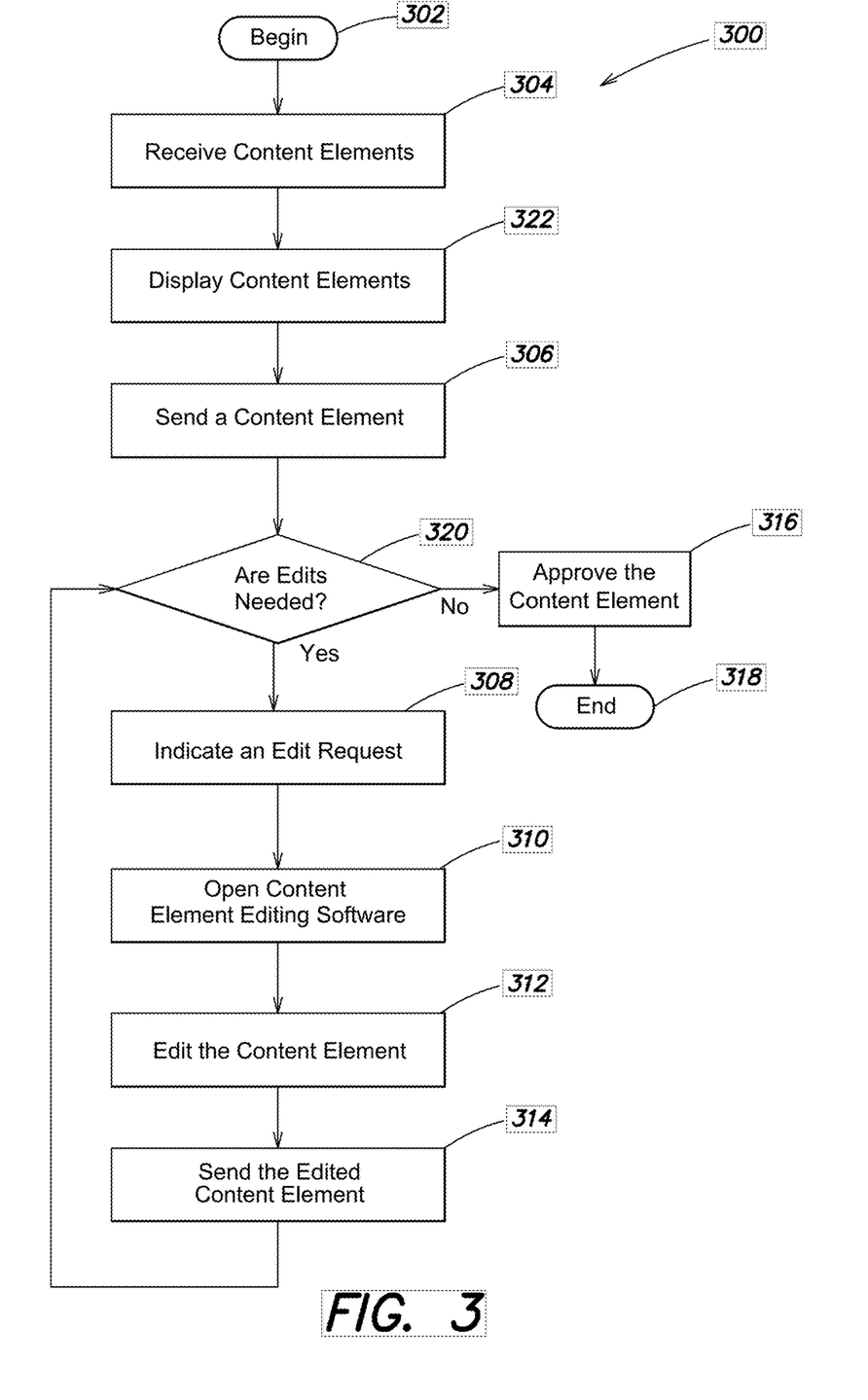
FIG. 3 is a block diagram of a process for managing content in accordance with some embodiments of the technology described herein.

FIG. 3 shows a diagram of an exemplary process 300 for managing content in accordance with some embodiments of the technology described herein. In some embodiments, the process 300 manages content assets through an editing and approval workflow in the desktop pallet application platform. In particular, at block 302, process 300 begins. At block 304, the desktop pallet application receives content assets. The content assets can include audio, video, text, documents, and other content types. The content assets may be received by the platform in multiple ways, such as from the user's desktop, a distributed computer system, remote storage, other enterprise applications, or a content store. At block 322, one or more received content assets are displayed in the desktop pallet application.

In some embodiments, one or more of the content assets include metadata information. This metadata may include information on the asset's creator and creation date, modifications and modification dates, file type, history through the workflow, annotation and markup information, approval status, association with creatives and campaigns, and other information. In some embodiments, the metadata is changed in each step of the process 300 to reflect the content asset's status within the process 300. The status of content assets within the process 300 can be tracked by users using this metadata. This tracking can be accomplished in the desktop pallet application, a dashboard interface, or enterprise workflow tracking software.

In some embodiments, the user can create or edit content assets within the desktop pallet application via application software accessed via plugins. Plugins may be provided for interoperability with basic desktop efficiency, office, creative, desktop search, and other desktop applications. Creative and office application software can be opened to create or edit content assets to be used in the desktop pallet application platform. Third parties may also create additional plugins to further extend compatibility between the desktop pallet application platform and other application software.

In some embodiments, instances of the third-party applications may be opened within the desktop pallet application rather than as individual desktop applications. In some embodiments, plugins give direct access capabilities to content stored in the desktop pallet application platform from within their respective desktop applications. Plugins may be provided for interoperability with basic desktop efficiency, office, creative, desktop search, and other desktop applications. Third parties may also create additional plugins to further extend compatibility between the desktop pallet application platform and other application software.

At block 306, the creative user sends a content asset to a second user via a command in the desktop pallet application. This second user may be a supervisor or collaborator to review the use of or any edits to the content asset. At decision block 320, the reviewing user reviews the submitted content asset and determines if edits are needed. This reviewing user may view, markup, annotate, and approve any submitted content assets in this review cycle via their own instance of the desktop pallet application, a separate reviewer application, or a compatible mobile application. The reviewing user may approve the content asset or make an edit request.

At block 308, the reviewing user indicates an edit request and sends it to the creative user via the desktop pallet application, reviewer application, or mobile application. The reviewing user may markup or annotate the content asset to describe requested changes. Upon completing markup and annotation on the content asset, the reviewing user sends the content asset back to the creative user via the desktop pallet application, reviewer application, or mobile application to request the edits be made. In some embodiments, the content asset is not necessarily returned to the same creative user, but is instead sent into a pool to be edited by any available creative user.

At block 310, the creative user who has received the edit request opens content asset editing software via a link in the desktop pallet application to implement the requested changes. In some embodiments, selecting the link opens the software via a plugin within the desktop pallet application, which is used to edit the content asset as described above. At block 312, the creative performs at least one edit operation on the content asset in the content asset editing software based upon the markups and annotations from the reviewing user.

At block 314, the edited content asset is sent to the reviewing user to be approved. If the reviewing user requests additional edits, the process 300 returns to block 308. If the reviewing user approves the edited content asset, the process 300 proceeds to block 316. In some embodiments, the content asset is not sent directly to the same reviewing user in subsequent submissions, but is instead sent to a pool to be reviewed by any available reviewing user.

At block 316, the content asset is approved by the reviewing user. Upon approval, the content asset may be used in creatives, advertisements, and advertising campaigns.

In some embodiments, a creative is authored using the approved content asset. The creative comprises one or more content assets, which may be of the same asset types (e.g., multiple image assets) or multiple asset types (e.g., an image asset with a text asset). In some embodiments, the creative may be distributed or published directly from the desktop pallet application.

In some embodiments, process 300 manages creatives in addition to, or instead of, content assets within the desktop pallet application platform. The process 300 proceeds as described previously for content assets, but instead is a workflow for the creation, editing, review, and approval of creatives. In some embodiments, upon approval of the creative, the creative may be distributed or published directly from the desktop pallet application.

In some embodiments, the system platform provides tools that may be used to plan, schedule and control feeds of syndicated video assets to third party platforms. For instance, the system may provide tools for packaging and publishing content assets automatically (e.g., as a video stream or video player bundle). Such a distributed system permits distribution to one or more third party platforms. To meet the ever-growing demands of marketing volume, campaign management and delivering personalized customer experiences, creatives and marketers must transform the work itself. In some embodiments, the platform connects ideation to content marketing distribution, syndication and analytics by helping internal and external stakeholders maximize efficiency through streamlined processes. Plus, the platform allows teams to visualize production costs, media spend and placement trends—reducing waste in the creation and adaptation processes. Additional benefits include optimized end-to-end marketing processes, a 360° view of product content, comprehensive asset management and increased re-use, increased production efficiencies, and enhanced automation and collaboration.

Desktop Pallet Application

According to some embodiments, a desktop pallet application is provided that allows creative users to be able to interact with enterprise solutions without the need open web browsers or to log into the separately. In some embodiments, the desktop pallet application provides aggregation and synchronization of, and interaction with content, workflows, tasks, communications, processes and plugins from enterprise systems that a creative user needs to use with their clients in a single desktop pallet which is accessible from an icon (e.g., on the Menu Bar on an Apple Mac and the System Tray on a Windows PC).

Figure 4:
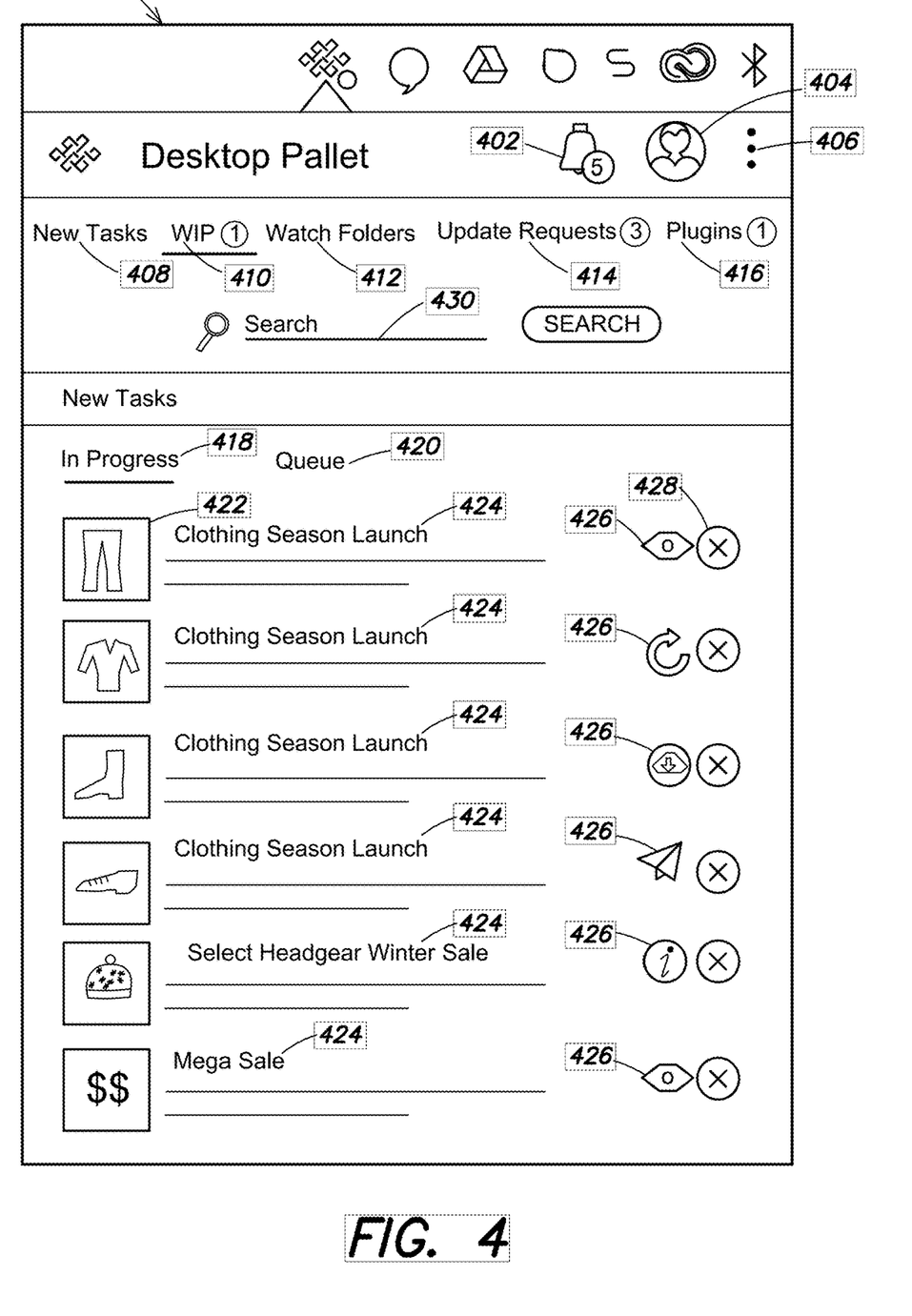
FIG. 4 shows an example implementation for a user interface for a desktop pallet application in accordance with some embodiments of the technology described herein.

FIG. 4 shows an example implementation for a user interface for a desktop pallet application 400 in accordance with some embodiments of the technology described herein. Below is a description of certain user interface features which may, according to various embodiments, be implemented alone or in combination with other features with any version of a desktop pallet application program. Each element and/or control may be displayed to the user as text or an icon. For instance, the desktop pallet application 400 may include the following elements and/or controls:

Menu Icon

The menu icon 406 allows access to the desktop pallet. When an update or new item is available for the creative user a notification appears to alert the user. Hovering over the menu icon 406 shows a list of updates available. Clicking on the menu icon 606 opens the pallet.

Bell Icon

The bell icon 402 provides a count of the alerts across the pallet. Clicking on the bell icon 402 opens an overlay which allows the user to see a roll up view of the alerts currently in effect. Clicking on the Alert in this overlay takes the user to the specific tab and alert in the desktop pallet application 400.

User Icon

The user icon 404 allows a user to navigate to their profile page in the desktop pallet application 400 platform. Here a user is able to change their picture and notification preferences among other things for the customers platform(s) that their application is connected to.

Collapsed Menu

The collapsed menu 406 provides the user with multiple choices related to the desktop pallet application. These may include checking for desktop pallet application 400 updates, navigation to the user's local synchronization root folder, opening the pallet as a window which stays open on screen (which may be nested alongside other application windows on their desktop, and changing the user's local pallet preferences.

Local pallet preferences provides a number of options to customize the user's experience in the desktop pallet application 400. For instance, the local pallet preferences may include the following options. The user may select their language used in the pallet and for plugins. The user may select if they want elements and/or controls in the user interface to be displayed as text or icons. The user may select between various different layouts of the elements and/or controls of the user interface. The user may select if they want operating system level desktop notifications for updates and events. The user may select manual or auto synchronization of content. The user may select their preferred services for synchronization of content and provide credentials for these services. The user may identify each customer platform/account that they need to log into and provide credentials for these, and also allow the user to disconnect from these platforms/accounts. If a user decides to disconnect, local synchronized copies of files are removed. The user may modify the default location of the synchronization root folder. The user may set QoS (Quality of Service) for percentage of bandwidth that should be used for synchronization purposes.

New Tasks Menu Item

The new tasks menu 408 allows a user to receive new tasks in a list. The new tasks menu 408 may include three tabs: an unread tab for new items that have not yet been opened, a read tab for items that have been opened but not yet accepted, and a communication tab for items where clarification has been requested prior to acceptance.

The user is able to filter by customer and campaign. The user is able to sort by customer, date received, date due, and campaign. When a task is clicked it automatically gets moved to the read queue, regardless of disposition. Clicking on the task takes the user to a task detail screen in the pallet. Here a creative user is able to see details around the task request. Items such as task brief, stakeholder info, and thumbnails for the included assets are displayed. The user is able to request more information through a chat function (which moves the task to the communication list). The user is able to decline the task—when this is done it is removed from the users New tasks menu, including the unread, read and communications tabs. The user is able to accept the Task. When this is done, the task moves to the queue tab under the work in progress (WIP) menu 410 item.

New tasks may also communicate other contractual information on the detail page such as updated rights terms where a specific change is required to the produced content rights terms outside of the creatives standard rights contract with the organization. In such a case the system may capture acceptance of rights through an electronic signature. Electronic signature involves verifying the user through a minimum of requesting them to re-authenticate (e.g., in accordance with Code of Federal Regulation title 21, Part 11 compliance for audit purposes).

WIP Menu Item

The WIP menu 410 allows a user to see tasks that have been accepted but not yet completed. This menu may include two tabs: an in progress tab 418 for tasks that have been accepted and started, and a queue tab 420 for tasks that have been accepted but not yet started In the in progress tab 418, the user is presented with a list of tasks that they have accepted and have started to work on. Each task on the task list may include an image 422, accompanying text 424, a context sensitive icon 426, and a delete icon 428. The image 422 displayed for each task may be based on that task's customer, campaign, or content asset, or content asset type, or each image may be uniquely generated. Each task in the task list includes customer name, campaign name, task name, short description, acceptance by and due by dates. Some or all of this information may be displayed in the accompanying text 424. The context sensitive icon 426 may change based on factors such as task type, current status of the task, and asset type. For example, if there has been updated communication regarding the task, the context sensitive icon may display an information symbol. For a task where the content has not yet been locally downloaded, the context sensitive icon 426 may display a download symbol. For a task where new content has been made available, the context sensitive icon 426 may display a refresh symbol. If the task's content has been staged and is pending submission, the context sensitive icon may display a submission symbol. A user may decline a task from their task list by selecting the delete icon 428.

Clicking on the task shows the latest information. When a user starts a task a local folder or folders depending on configuration for the type of task is created under Root Folder|Customer Name|Task Name on the users machine (based off the initial path set in preferences as described above).

If there is content provided as part of the task and if the user has selected auto synchronization in their preferences, the desktop pallet application 400 platform makes a copy of provided materials on their local machine. If there is content provided as part of the task and if the user has selected manual synchronization in their preferences, the desktop pallet application 400 platform gives the user controls to make a copy of provided materials on their local machine. The synchronization may occur through an EFSS technology from another vendor or through a platform mechanism. The creation of the folder structure and triggering of synchronization is provided by the platform regardless. If materials are updated at any point in time, messages are presented to the user and controls are presented to the user to allow them to synchronize the new content. Users save their work locally in one of the created folders and are given controls within the Pallet through the pallet to synchronize the content back to the platform.

When clicking on the task, the user is taken to the task detail view where they are again given the opportunity to review the details for the task, as well as a button allowing navigation directly to the local folder(s) associated with the task. If a user has a question at any point while working on the task, they are able to communicate through the task detail view with a stakeholder for the task. In some embodiments, the desktop pallet application includes an instant messaging feature, allowing users of the platform to communicate each other. In some embodiments, all communication related to a particular creative is stored within the platform for auditing purposes. The desktop pallet application 400 gives the user controls to submit their deliverable once it is ready along with any notes that they wish to provide. When submitting, the desktop pallet application 400 platform synchronizes the created content from the local folder to the platform and into the next step in the workflow (usually review, markup, annotation and approval. By virtue of the content being associated with the task; campaign, task, rights and other information inherited from agreements in accepting the task and information from enterprise systems are registered alongside the content. Once submitted the task is removed from the WIP tab 410 task list. Once content is approved, the desktop pallet application 400 platform triggers a clean up routine which deletes the folder structure created for the task along with its associated content.

In the queue tab 420, the user is presented with a list of tasks that they have accepted but have not yet started to work on. Clicking on a task shows the latest information. When the user begins work on the task, the task is moved from the queue tab 420 to the in progress tab 418.

Update Requests

When content is submitted per the above tab, it moves into a review cycle. During the review cycle annotations and markups are applied to the content. The update requests tab 414 is populated with tasks and content where requests for changes have been made from the review cycle. This again is a list of tasks in a display similar to the one described above, but this time, clicking into the task gives allows the user to see each of the annotations and markups for the changes. The user is able to work through each one and mark them as complete once the requested change has been made. Within the task and review view the user is able to use an onscreen control to navigate directly to the folder structure and the submitted content. During this process again, the user works from the local copy of the content that they submitted. Once the user has completed all updates they again submit the updated content along with notes, this time from the task and review view. Once submitted the task is removed from the update requests tab 414 queue.

Watch Folders

Watch folders 412 enable a user to identify local folders on their machine whose contents should be automatically synchronized to the platform. Within the platform these are held under a staging lifecycle state, so only available to select users in order that they are curated and checked for governance prior to being allowed into the solution.

Plugins

In some embodiments, an interface for managing plugins associated with certain content elements is provided. This interface may be selected via the plugins tab 416. The pallet automatically detects installed software which the platform supports plugins for. When supported software is detected, the solution allows the user to install the required plugin directly from the pallet itself. When installing the plugins, the pallet leverages preference information in order to configure the plugins. If a new version of the plugin becomes available, or if the version of software is updated, requiring a newer plugin the desktop pallet application 400 alerts the user and gives them to option to install the new plugin. The user is also able to remove any of the plugins via the desktop pallet application 400 from installed software.

Search Bar

In some embodiments, a search bar 430 is provided. The search bar 430 may allow the user to search tasks, content assets, asset types, customers, statuses, and campaigns. In some embodiments, the desktop pallet application 400 platform may suggest searches to select based upon the keyword or keywords entered. For example, using AI/ML, the platform may use natural language constructs, the user's prior searches, the prior searches of the user's peers, and the prior searches of the user's groups to suggest searches. By using AI/ML, the search functionality may become more personalized the more frequently the user utilizes it.

Dashboard

In some embodiments, a dashboard interface is provided that allows users to view the progress of content development. In some embodiments, the interface populates real-time data on your content's progress, delivers a robust framework to monitor internal and external success and tells the complete narrative behind your ROI. In some embodiments, it is appreciated that users benefit from deep content insights based on actual activities, costs and content performance end-to-end relating to the content development process. Further, such interfaces may allow users to eliminate silos between tools, processes and people. Further, the interface may provide an enterprise view of content production, and users may be provided greater transparency for governance in different regions.

Example Computer Architecture

The hardware that the described systems and methods may reside on can vary based on certain factors. Because the system uses an observer-based architecture, there is flexibility around how many different metrics may be analyzed during a given performance. If cost dictates that less robust hardware be used, the number of metrics that can be analyzed simultaneously may be reduced. The more robust the hardware available, the greater the number of metrics and media streams that may be analyzed simultaneously.

Figure 5:
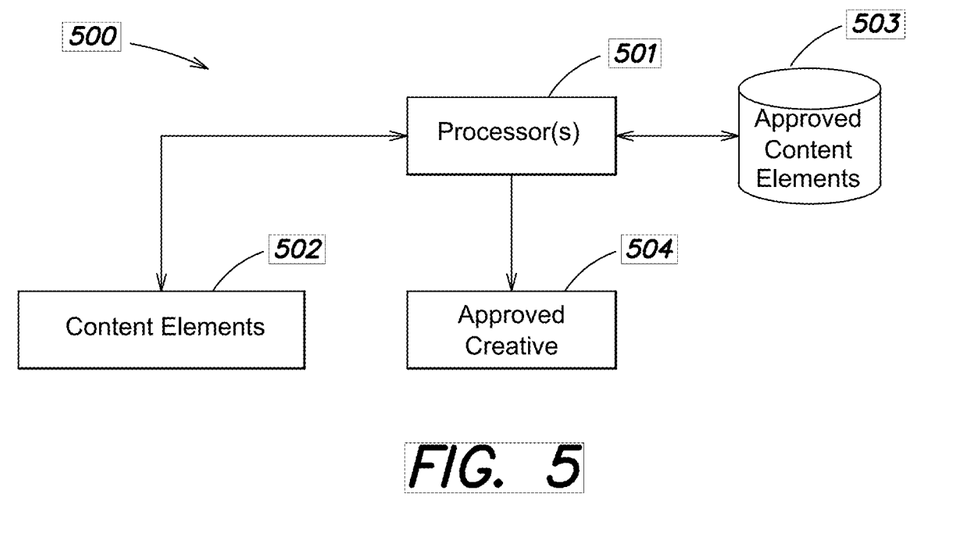
FIG. 5 shows an example implementation for a system for managing content in accordance with some embodiments of the technology described herein.
Figure 6:
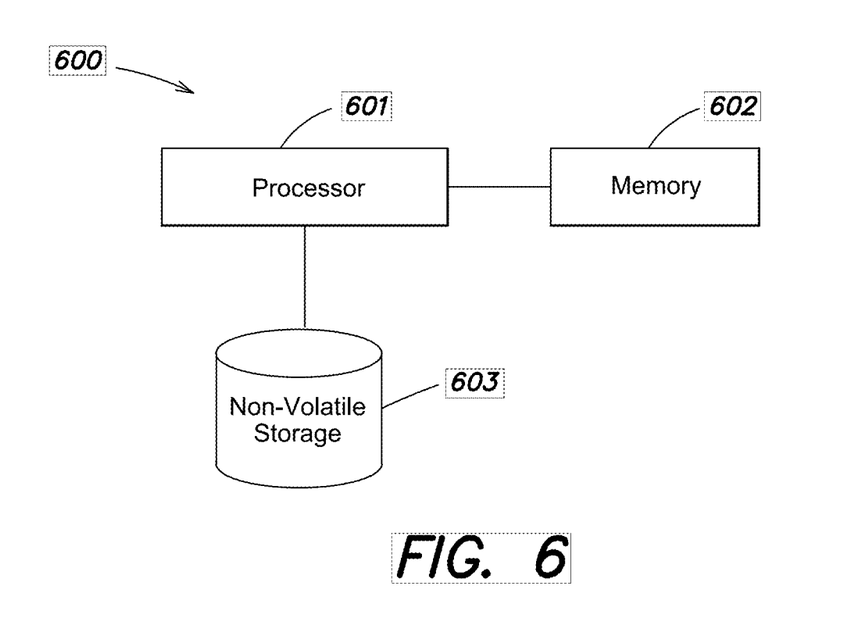
FIG. 6 shows an example computer system for executing a system for managing content.

One example implementation of the described systems and methods is shown in FIG. 5. In particular, system 500 may include one or more processors 501 that are operable to generate an approved creative (e.g., element 504). Such information may be stored within memory or persisted to storage media. In some embodiments, processors 501 may receive one or more content elements 502 from external sources. In some embodiments, processors 501 may receive and/or generate approved content elements 503 according to the described systems and methods. Processors 501 may be configured to execute the described systems and methods to generate and approve approved creatives 404 based on external content elements 502 and approved content elements 503. An illustrative implementation of a computing device 600 that may be used in connection with any of the embodiments of the disclosure provided herein is shown in FIG. 6. The computing device 600 may include one or more processors 601 and one or more articles of manufacture that comprise non-transitory computer-readable storage media (e.g., memory 602 and one or more non-volatile storage media 603). The processor 601 may control writing data to and reading data from the memory 602 and the non-volatile storage device 603 in any suitable manner. To perform any of the functionality described herein, the processor 601 may execute one or more processor-executable instructions stored in one or more non-transitory computer readable storage media (e.g., the memory 603), which may serve as non-transitory computer readable storage media storing processor-executable instructions for execution by the processor 601.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As referred to herein, the term "in response to" may refer to initiated as a result of or caused by. In a first example, a first action being performed in response to a second action may include interstitial steps between the first action and the second action. In a second example, a first action being performed in response to a second action may not include interstitial steps between the first action and the second action.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for creating an advertising creative, the method comprising acts of:
  receiving, from a distributed computer system, at a user interface for a creative user, a plurality of tasks;
  displaying on the user interface for the creative user, a new task menu;
  receiving a selection by the creative user, the new task menu on the user interface;
  displaying on the user interface for the creative user, responsive to the selecting the new task menu by the creative user, a list of the plurality of tasks organized into a plurality of tabs including a first tab including one or more first items from the plurality of tasks that have not yet been opened, a second tab including one or more second items from the plurality of task that have been opened but not yet accepted by the creative user, and a third tab including one or more third items for which a clarification has been requested prior to acceptance;
  displaying on the user interface for the creative user, a filter menu;
  receiving from the creative user on the filter menu of the user interface one or more filter terms comprising a customer identifier and a campaign identifier;
  filtering the list of the plurality of tasks to display one or more of the plurality of tasks that match the one or more filter terms;
  receiving from the creative user on the user interface a selection of a first task from the plurality of tasks;
  displaying, responsive to the selection of the first task by the creative user, information on the selected first task comprising a task brief, shareholder information, and assets;
  determining, responsive to the selection of the first task from the plurality of tasks, whether the creative user has access to one or more content elements related to the first task, wherein the determining is based on metadata information for the one or more content elements;
  based on determining that the creative user has access to the one or more content elements related to the first task, receiving, from the distributed computer system, at the user interface for the creative user, respective representations of the one or more content elements and accessing a plurality of software applications including content element editing software and search software to process the one or more content elements from the user interface directly without accessing a web browser or logging into any of the plurality of software applications;
  storing a local copy of at least one content element for the creative user, wherein the creative user creates or edits the at least one content element within the user interface;
  displaying a representation of the at least one content element in the user interface to the creative user;
  sending, responsive to a control input within the user interface to submit the at least one content element for approval, the representation of the at least one content element from the creative user to a reviewing user, wherein a status of the first task is updated to indicate that the creative user has completed the first task and a version of the at least one content element is stored at the distributed computer system, wherein the reviewing user uses markup or annotates the at least one content element to describe requested changes;
  receiving, from the distributed computer system, at the user interface for the creative user, a second task for an edit request from the reviewing user and indicating the edit request from the reviewing user to the creative user within the user interface, wherein the edit request includes the markup or annotations from the reviewing user;
  subsequent to a selection of the second task, receiving, at the user interface for the creative user, a request to open the at least one content element within the content element editing software;
  opening, within the user interface, via a link, the at least one content element within the content element editing software, wherein opening the at least one content element within the content element editing software comprises opening a version of the at least one content element suitable for the content element editing software;
  performing at least one edit operation, responsive to an editing control operated by the creative user, within an interface of the content element editing software, on the at least one content element based on the markup or annotations from the reviewing user included in the edit request;
  sending, responsive to a control input within the user interface to submit the at least one content element for approval, a representation of the edited at least one content element from the creative user to the reviewing user for approval, wherein a status of the second task is updated to indicate the creative user has completed the second task and a version of the edited at least one content element is stored at the distributed computer system; and
  allowing the edited at least one content element to be used in an advertising creative based on the reviewing user approving the edited at least one content element, wherein metadata information for the edited at least one content element is updated to indicate approval and any local copy of the edited at least one content element is removed.

2. The computer-implemented method according to claim 1, wherein the link comprises a link to a plugin for the content element editing software.

3. The computer-implemented method according to claim 1, further comprising the act of tracking, by a workflow manager, a status of the at least one content element using the metadata information.

4. The computer-implemented method according to claim 1, further comprising the acts of:
  performing at least one combining operation, responsive to a control input within the user interface, combining the at least one content element with the plurality of content elements into an advertisement; and
  publishing, responsive to a control input within the user interface, the advertisement.

5. The computer-implemented method according to claim 1, wherein the at least one content element comprises a file type, the file type comprising a video file, an image file, and/or a document.

6. The computer-implemented method according to claim 5, wherein the content element editing software can edit the file type of the at least one content element.

7. The computer-implemented method according to claim 1, wherein the act of sending a representation of the edited at least one content element from the creative user to a reviewing user comprises:
updating, responsive to a control input within the user interface, the at least one content element on the distributed computer system with the edited at least one content element;
receiving, from the distributed computer system, a representation of the edited at least one content element.

8. The method of claim 1, wherein the act of opening, within the user interface, via a link, content element editing software comprises opening, within the user interface, via the link, the content element editing software without opening a web browser or another application or logging into the web browser or the another application separately.

9. A computer-implemented system for creating an advertising creative, the system comprising:
a communication interface configured to receive, from a distributed computer system, at a user interface for a creative user, a plurality of tasks;
displaying on the user interface for the creative user, a new task menu;
receiving a selection by the creative user, the new task menu on the user interface;
displaying on the user interface for the creative user, responsive to the selecting the new task menu by the creative user, a list of the plurality of tasks organized into a plurality of tabs including a first tab including one or more first items from the plurality of tasks that have not yet been opened, a second tab including one or more second items from the plurality of task that have been opened but not yet accepted by the creative user, and a third tab including one or more third items for which a clarification has been requested prior to acceptance;
displaying on the user interface for the creative user, a filter menu;
receiving from the creative user on the filter menu of the user interface one or more filter terms comprising a customer identifier and a campaign identifier;
filtering the list of the plurality of tasks to display one or more of the plurality of tasks that match the one or more filter terms;
receiving from the creative user on the user interface a selection of a first task from the plurality of tasks;
displaying, responsive to the selection of the first task by the creative user, information on the selected first task comprising a task brief, shareholder information, and assets;
the communication interface further configured to receive, from the distributed computer system, at the user interface for the creative user, respective representations of a plurality of content elements associated with at least one of the plurality of tasks, at least one content element of the plurality of content elements having metadata information, wherein the creative user creates or edits the at least one content element within the user interface if the metadata information indicates that the creative user has access to the at least one content element by accessing a plurality of software applications including content element editing software and search software to process the at least one content element from the user interface directly without accessing a web browser or logging into any of the plurality of software applications;
the user interface configured to display a representation of the at least one content element to the creative user;
at least one computer processor programmed to:
send, responsive to a control input within the user interface, the representation of the at least one content element from the creative user to a reviewing user, wherein the reviewing user uses markup or annotates the at least one content element to describe requested changes;
receive an edit request from the reviewing user and indicate the edit request from the reviewing user to the creative user within the user interface, wherein the edit request includes the markup or annotations from the reviewing user;
open, within the user interface, via a link, content element editing software;
perform at least one edit operation, responsive to an editing control operated by the creative user, within an interface of the content element editing software, on the at least one content element based on the markup or annotations from the reviewing user included in the edit request;
send, responsive to a control input within the user interface, a representation of the edited at least one content element from the creative user to the reviewing user for approval; and
allow the edited at least one content element to be used in an advertising creative based on the reviewing user approving the edited at least one content element.

10. The computer-implemented system according to claim 9, wherein the link comprises a link to a plugin for the content element editing software.

11. The computer-implemented system according to claim 9, further comprising a workflow manager configured to track a status of the at least one content element using the metadata information.

12. The computer-implemented system according to claim 9, wherein the at least one computer processor is further programmed to:
perform at least one combining operation, responsive to a control input within the user interface, to combine the at least one content element with the plurality of content elements into an advertisement; and
publish, responsive to a control input within the user interface, the advertisement.

13. The computer-implemented system according to claim 9, wherein the at least one content element comprises a file type, the file type comprising a video file, an image file, and/or a document.

14. The computer-implemented system according to claim 13, wherein the content element editing software can edit the file type of the at least one content element.

15. The computer-implemented system according to claim 9, wherein the at least one computer processor is further programmed to:
update, responsive to a control input within the user interface, the at least one content element on the distributed computer system with the edited at least one content element;
receive, from the distributed computer system, a representation of the edited at least one content element.

* * * * *